United States Patent [19]

Shiraki et al.

[11] Patent Number: 4,725,752
[45] Date of Patent: Feb. 16, 1988

[54] 1-PHASE SELF STARTING DISK-TYPE BRUSHLESS MOTOR WITH COGGING ELEMENT

[75] Inventors: Manabu Shiraki, Yamato; Osami Miyao, Sagamihara, both of Japan

[73] Assignee: Shicoh Engineering Co., Ltd., Kanagawa, Japan

[21] Appl. No.: 909,709

[22] Filed: Sep. 22, 1986

[51] Int. Cl.$^4$ ............................................. H01K 21/14
[52] U.S. Cl. ..................................... 310/268; 310/156
[58] Field of Search ................... 310/68 R, 254, 268, 310/67 R, 156

[56] References Cited

U.S. PATENT DOCUMENTS 3,840,761 10/1974 Muller .................................. 310/268
4,620,139 10/1986 Egami et al. ........................... 310/62

Primary Examiner—Patrick R. Salce
Assistant Examiner—D. L. Rebsch
Attorney, Agent, or Firm—Wegner & Bretschneider

[57] ABSTRACT

A 1-phase coreless disk-type brushless motor comprises a single position-detecting element located at a stationary position corresponding to a magnetically active conductor portion of an armature coil or coils on a stator yoke. A cogging-generating magnetic element having a width substantially equal to the width of each pole of a field magnet is located such that the center radial line between the width thereof is spaced by a distance equal to about three fourths of the pole width from another magnetically active conductor portion of the armature coil or coils so that the magnet rotor may stop at a position from which the motor can start itself.

4 Claims, 12 Drawing Figures

FIG. 1 - PRIOR ART
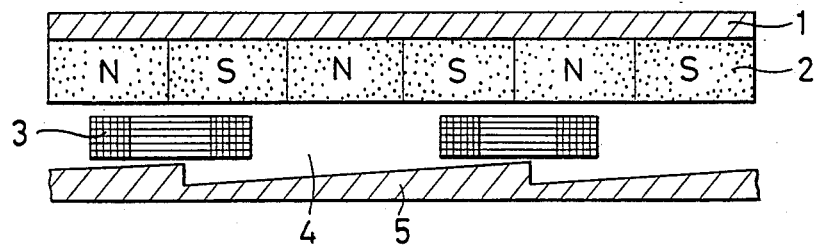
FIG. 2 - PRIOR ART
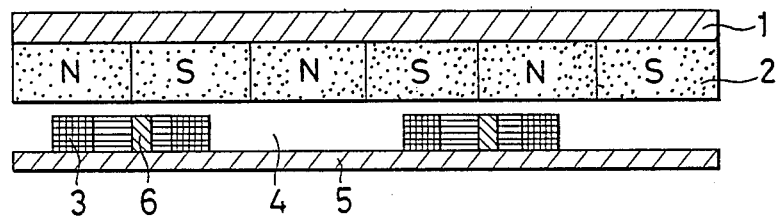
FIG. 3
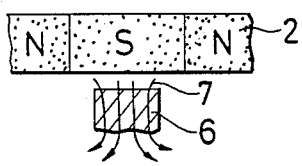
FIG. 4
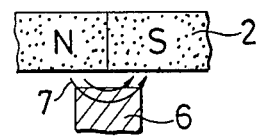
FIG. 5
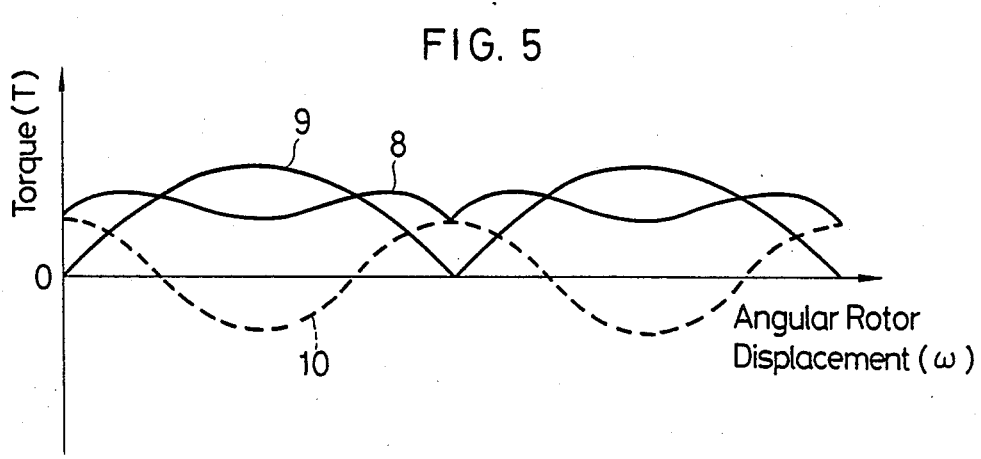

1-PHASE SELF STARTING DISK-TYPE BRUSHLESS MOTOR WITH COGGING ELEMENT

BACKGROUND OF THE INVENTION

1. Field of the Invention

This invention relates to a 1-phase energized disk-type brushless motor.

2. Description of the Prior Art

A 1-phase or single phase motor has a dead point at an energization switching point at which the motor provides zero torque. Accordingly, the 1-phase motor has the drawback that it cannot start itself if the rotor position upon starting of the motor is just at a dead point.

Therefore, a 1-phase motor is normally provided with a cogging generating magnetic member (an iron piece is used therefor) for generating a torque (cogging torque) in addition to a torque generated by an armature coil and a field magnet (rotor magnet) in order to eliminate such dead points, to allow self-starting of the motor.

In a coreless motor, for example, the following methods for generating a cogging torque are known. Referring first to FIG. 1, a 6-pole field magnet or magnet rotor 2 having an alternate arrangement of the 6 north and south poles is mounted on a rotor yoke 1 in an opposing relationship to a stator yoke 5 with an air gap 4 left therebetween and with a pair of coreless armature coils 3 disposed in the air gap 4. In the motor of FIG. 1, the stator yoke 5 has at a face thereof opposing the field magnet 2 two inclined surfaces which thus define the complementarily inclined air gap 4. This method, however, has a drawback that the efficiency is relatively low because the air gap is relatively great.

Referring now to FIG. 2, another method is illustrated. In the motor of FIG. 2, a stator yoke 5 has no such inclined faces as provided on the stator yoke 5 of FIG. 1. Instead, an iron bar 6 is mounted on the stator yoke 5 and extends through each of a pair of coreless armature coils 3 disposed in a uniform air gap 4 defined by the stator yoke 5 and a field magnet or magnet rotor 2 on a rotor yoke 1. According to this arrangement, a magnetic flux will appear as seen in FIG. 3 and hence the field magnet 2 will stop at a position in which the iron bars 6 are each opposed to the center of one of the N and S poles of the field magnet 2. Accordingly, if the armature coils 3 are located so as to produce a rotational torque in such a stopping position of the field magnet 2, a coreless motor which can start itself will be obtained.

However, the method as shown in FIG. 2 has a drawback that if the thickness of the iron bars 6 is increased in order to increase the cogging torque, a phenomenon that the torque around dead points decreases will appear because a magnetic flux 7 will act as shown in FIG. 4 around the dead points.

In order to obtain an ideal torque-angular rotor displacement curve, it is necessary to obtain a composite torque curve 8 as shown in FIG. 5. In FIG. 5, an armature coil torque curve of an armature coil is indicated by a curve 9 while a cogging torque curve of a cogging generating magnetic member is indicated by a curve 10. As apparent from the armature coil torque curve 9 and the cogging torque curve 10, the cogging torque should be a half of the armature torque in magnitude. Accordingly, the torque curve 8 composite of the armature coil torque and the cogging torque exhibits a substantially uniform rotational torque over the entire range of rotation.

In order to obtain such an ideal composite torque curve 8, a cogging magnetic member must be designed correctly in size and location.

SUMMARY OF THE INVENTION

It is an object of the present invention to provide a 1-phase energized coreless disk-type brushless motor which can start itself with a single position detecting element and provide a cogging torque having a sufficient magnitude and showing an ideal torque-angular rotor displacement curve.

It is another object of the invention to provide a 1-phase energized coreless disk-type brushless motor which can start itself with a single position-detecting element and generate a uniform turning torque over an entire range of rotation thereof.

It is a further object of the invention to provide an efficient 1-phase energized coreless disk-type brushless motor which can rotate smoothly with reduced rotational noises.

In order to attain the objects, according to the present invention, there is provided a 1-phase energized disk-type brushless motor, comprising: a field magnet as a rotor having 2P (P is an integer equal to or greater than 1) alternate north and south poles; one or more coreless armature coils disposed at stationary same-phase positions in a face-to-face opposing relationship to said field magnet with an axial air gap left therebetween; a stator yoke located below said armature coil or coils; a cogging generating magnetic element located at a stationary position and having a width equal to or substantially equal to the width of each pole of said field magnet; and a single position-detecting element located at a stationary position for detecting a pole of said field magnet; said cogging generating magnetic element being located such that the center axial line thereof is spaced by a distance equal to substantially three fourths of the pole width of said field magnet form a position at which a maximum starting torque can be generated; said cogging generating magnetic element being shaped such that the volume or area thereof gradually increases in the direction of rotation of said rotor.

BRIEF DESCRIPTION OF THE DRAWINGS

FIG. 1 is a developed illustrative view of a rotor and a stator of a 1-phase coreless-type brushless motor illustrating a conventional means for generating a cogging torque;

FIG. 2 is a similar view but illustrating another conventional means for generating a cogging torque;

FIG. 3 is an illustrative view of part of the motor of FIG. 2 illustrating a stopping position of the rotor;

FIG. 4 is a similar view but illustrating magnetic flux around a dead point of the motor of FIG. 2;

FIG. 5 is a graph showing an ideal composite torque curve for a 1-phase energized disk-type brushless motor;

DESCRIPTION OF THE PREFERRED EMBODIMENTS

Figure 6:
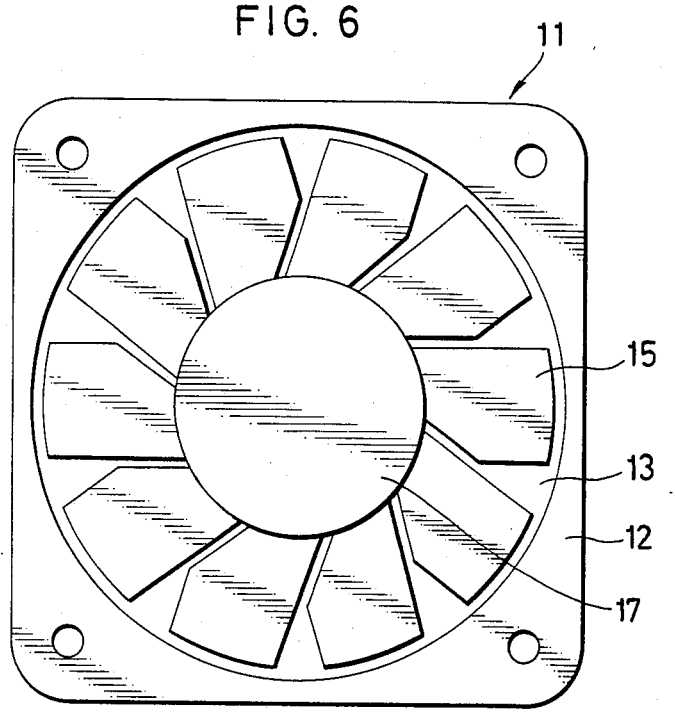
FIG. 6 is a plan view of a typical conventional 1-phase coreless disk-type axial-flow brushless fan motor.
Figure 7:
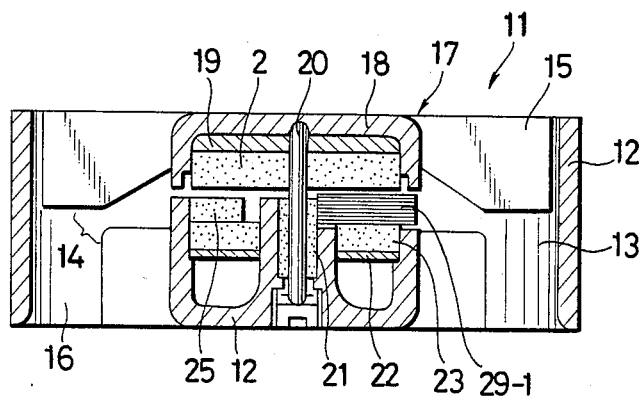
FIG. 7 is a vertical sectional view of the motor of FIG. 6.
Figure 8:
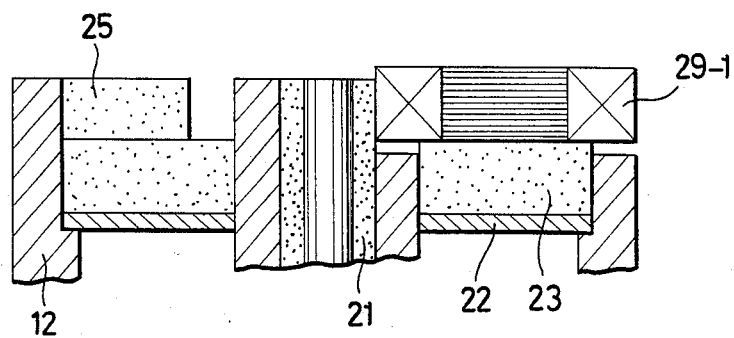
FIG. 8 is an enlarged vertical sectional view of the stator of the motor of FIG. 7.

Referring to FIGS. 6 to 10, a disk-type brushless fan motor 11 includes a casing 12 made of plastic material and having a rectangular shape in plan (FIG. 6) and a cup-shaped vertical section (FIG. 7), with an inner spacing 13 formed therein in which a motor device 14 which will be hereinafter described is located. A plurality of stays not shown are formed at the bottom of the spacing 13 and define therebetween inlet windows 16 for passing therethrough airflow caused by a fan blade 15 which will be hereinafter described.

Figure 10:
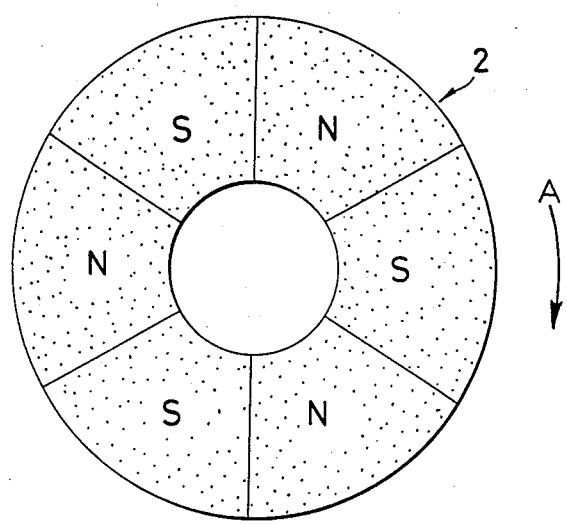
FIG. 10 is an illustrative bottom plan view of a 6-pole field magnet.

The disk-type axial-flow brushless fan motor 11 further includes a rotor 17 having a plurality of fan blades 15 integrally formed around an outer periphery of a cup-shaped body 18 made of plastic material. The cup-shaped body 18 has a rotor yoke 19 securely mounted on an inner face thereof, and a 6-pole field magnet or magnet rotor 2 is securely mounted on a lower face of the rotor yoke 19 and has 6 alternate N and S magnet poles magnetized with an equal magnetization angular width of 60 degrees as shown in FIG. 10. A rotary shaft 20 is secured at an end thereof to the rotor 17 and supported for rotation adjacent the other end thereof by means of an oilless metal bearing 21.

A printed circuit board 22 is supported on the casing 12, and a stator yoke 23 is located on the printed circuit board 22. The stator yoke 23 is formed as an integral member with a cogging generating magnetic member 25 which will be hereinafter described. The stator yoke 23 is provided for closing a magnetic path of the field magnet 2.

Such 1-phase energized disk-type brushless motors of good performance can be mass produced at low cost if the stator yoke 23 having the cogging generating magnetic member 25 formed in an integral relationship therewith is molded of powder of a non-magnetic substance such as a plastic material in which powder of a magnetic substance such as iron is intermixed. Accordingly, the stator yoke 23 and the cogging generating magnetic member 25 are very conveniently formed in an integral relationship from a special magnetic material which is made of powder of a non-magnetic substance such as a plastic material in which powder of a magnetic substance such as iron is intermixed. The special magnetic material is easy to work and has sufficient magnetic permeability, though lower than that of iron. The special magnetic member is also advantageous in that it will cause less iron loss.

Figure 9:
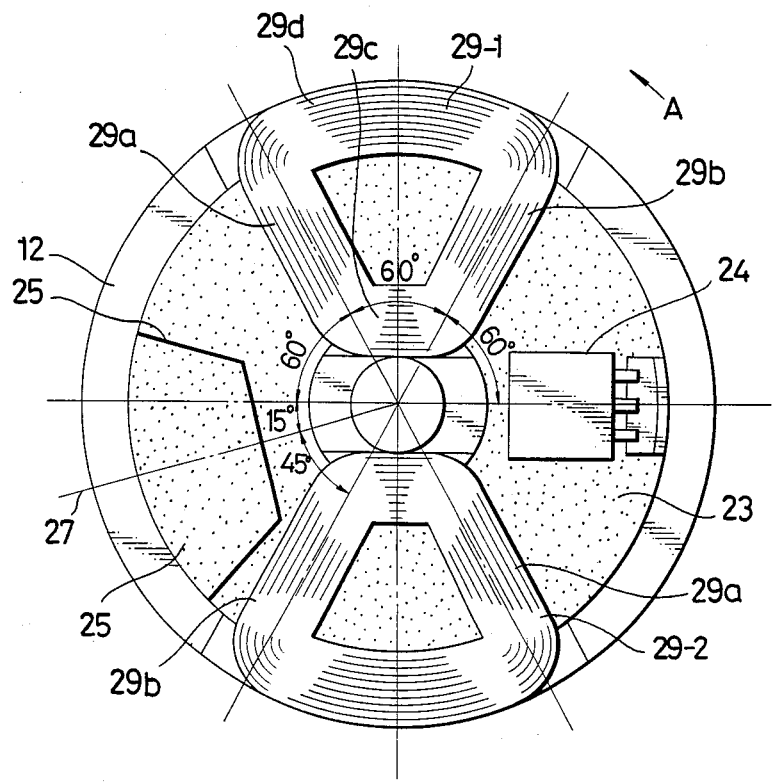
FIG. 9 is a plan view of a stator armature of the motor of FIG. 6.

The stator yoke 23 is processed for insulation on a surface thereof and includes a pair of coreless-type armature coils 29-1, 29-2 fixedly mounted thereon and arranged in a symmetrical relationship relative to the center of the motor 11, that is, in a spaced relationship by an angle of 180 degrees around the center of the motor 11, as shown in FIG. 9. The armature coils 29-1, 29-2 are approximately sector-shaped in plan and each have a pair of radial, magnetically active conductor portions 29a, 29b which contribute to generation of a torque and include therebetween a distance or angular width substantially equal to the angular width of each magnet pole of the field magnet 2. In particular, because the field magnet 2 has 6 poles and hence the width of each pole thereof is 60 degrees, the width between the magnetically active conductor portions 29a, 29b is 60 degrees. Each of the armature coils 29-1, 29-2 further has a pair of circumferential conductor portions 29c, 29d which do not contribute to generation of a torque.

A position-detecting element 24 composed of a magnetoelectric transducer such as a Hall element, a Hall IC (integrated circuit) or a magnetic reluctance element is located at a position circumferentially displaced by an angle substantially equal to the width of each pole of the field magnet 2, that is, by an angle of 60 degrees, from the magnetically active conductor portion 29b of the armature coil 29-1. Accordingly, the position-detecting element 24 is arranged at a position intermediate the magnetically active conductor portion 29b of the armature coil 29-1 and the magnetically active conductor portion 29a of the armature coil 29-2.

The cogging generating magnetic member 25 is formed in an integral relationship with the stator yoke 23 from the special material described above and projects above an upper face of the stator yoke 23. The cogging generating magnetic member 25 is in the form of a plate having an angular width substantially equal to the angular width of each pole of the field magnet 2, that is, an angular width of 60 degrees. The cogging generating magnetic member 25 is located on the stator yoke 23 such that the center radial line 27 between the width thereof is spaced by about three fourths of the width of each pole of the field magnet 2, that is, by an angle of 45 degrees, from the magnetically active conductor portion 29b of the armature coil 29-2.

Figure 11:
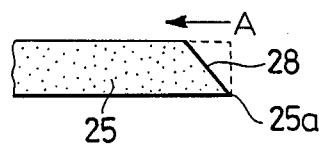
FIG. 11 is an enlarged vertical sectional view of a cogging generating magnetic member.

Referring now to FIG. 11, the cogging generating magnetic member 25 has a tapered face 28 formed at one end 25a thereof in the direction of rotation of the rotor (field magnet 2) (in a direction indicated by an arrow mark A) such that the volume thereof gradually increases in the direction of rotation of the rotor.

Figure 12:
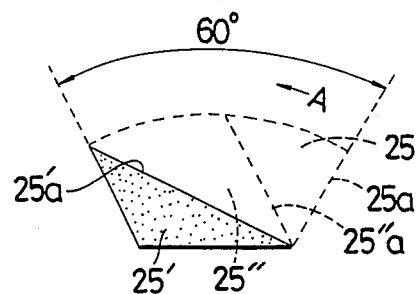
FIG. 12 is a plan view showing cogging generating magnetic members of modified forms.

Referring now to FIG. 12, a modified cogging generating magnetic member 25' is shown. The cogging generating magnetic member 25' is cut away obliquely as along a solid line denoted at 25'a such that the volume and area thereof gradually increases in the direction of rotation of the rotor toward a position of the end 25a shown by a broken line. Thus, the cogging generating magnetic member 25' presents a triangular shape in plan.

A further modified cogging generating magnetic member 25" may be also seen in FIG. 12. The cogging generating magnetic member 25" is cut away obliquely as along a broken line denoted at 25"a intermediate the solid line 25'a and the broken line 25a so as to attain a similar effect. Thus, the cogging generating magnetic member 25" here presents an irregular square shape like a parallelogram with one side thereof replaced by an arc.

The cogging generating magnetic members 25', 25" may or may not have such a tapered face as denoted at 28 in FIG. 11 along the oblique edges 25'a, 25"a thereof.

Since the disk-type brushless fan motor 11 according to the present invention has such a construction as described above, the field magnet 2 which is mounted for relative rotation in a face-to-face opposing relationship to the armature coils 29-1, 29-2, the position detecting element 24 and the cogging generating magnetic member 29 will stop, upon stopping of the motor 11, at a position wherein the cogging generating magnetic member 25 is attracted by one of the N and S poles of the field motor 2 to enable self-starting of the motor 11. Accordingly, if the power source is switched in again, since the position-detecting element 24 detects an N or S pole of the field magnet 2, the armature coils 29-1, 29-2 are energized in a predetermined direction in response to a signal from the position detecting element 24 to thus generate an armature coil torque in a predetermined direction. Consequently, the rotor 17 having the field magnet 2 thereon is driven to rotate, to cause the blades 15 thereon to send airflow through the inlet openings 16. In this manner, a cogging torque is generated due to the presence of the cogging generating magnetic member 25 which moves the rotor 17 to a position other than dead points. Accordingly, an N or S pole of the field magnet 2 will soon be detected by the position-detecting element 24, and hence the rotor 17 can thereafter rotate continuously. Besides, because the cogging generating magnetic member 25 having such a shape as described above is located at such a position as described above, an ideal cogging torque will be generated at an ideal rotational angular position, and hence a rotational torque will be obtained which is substantially uniform over an entire range of rotational angle.

It is to be noted that while the motor described above contains two armature coils, it may otherwise contain one or three or more armature coils therein.

What is claimed is:

1. A 1-phase energized disk-type brushless motor, comprising:

a rotor comprising a field magnet having 2P alternate north and south poles of essentially equal circumferential pole width, P being an integer greater than 1;

a stator yoke disposed with a surface thereof opposite one side of said field magnet with an axial air gap left therebetween;

at least one coreless armature coil disposed at the same phase positions on said surface of the stator yoke;

an undivided cogging generating magnetic element located on said surface of the stator yoke and having a width which is substantially equal to the circumferential pole width; and a single position-detecting element for detecting each pole of said field magnet;

wherein the cogging generating magnetic element has an axial center line which is spaced by a distance substantially equal to three fourths of the circumferential pole width from a position at which a maximum starting torque can be generated, said cogging generating magnetic element being shaped such that the volume thereof gradually increases in the direction of rotation of the rotor.

2. A 1-phase energized disk-type brushless motor according to claim 1, wherein said cogging generating magnetic element is located such that the center axial line thereof is spaced by a distance equal to three fourths or substantially three fourths of the width of each pole of said field magnet from a position corresponding to a magnetically active conductor portion of said armature coil or coils which contributes to generation of a torque.

3. A 1-phase energized disk type brushless motor as claimed in claim 1, wherein said cogging generating magnetic element is tapered such that the area thereof gradually increases in the direction of rotation of said rotor.

4. A 1-phase energized disk-type brushless motor according to claim 3, wherein said cogging generating magnetic element is located such that the center axial line thereof is spaced by a distance equal to three fourths or substantially three fourths of the width of each pole of said field magnet from a position corresponding to a magnetically active conductor portion of said armature coil or coils which contributes to generation of a torque.

* * * * *